(12) United States Patent
Hoffman, Jr. et al.

(10) Patent No.: US 6,615,266 B1
(45) Date of Patent: Sep. 2, 2003

(54) INTERNET COMPUTER SYSTEM WITH METHODS FOR DYNAMIC FILTERING OF HYPERTEXT TAGS AND CONTENT

(75) Inventors: Gene Hoffman, Jr., Emerald Hills, CA (US); Mark B. Elrod, Reno, NV (US)

(73) Assignee: Networks Associates Technology, Inc., Santa Clara, CA (US)

( * ) Notice: Subject to any disclaimer, the term of this patent is extended or adjusted under 35 U.S.C. 154(b) by 523 days.

(21) Appl. No.: 09/618,224

(22) Filed: Jul. 18, 2000

Related U.S. Application Data

(63) Continuation of application No. 08/815,164, filed on Mar. 11, 1997, now Pat. No. 6,122,657.
(60) Provisional application No. 60/037,161, filed on Feb. 4, 1997.

(51) Int. Cl.[7] .............................................. G06F 15/16
(52) U.S. Cl. ....................................... 709/227; 705/513
(58) Field of Search ............................... 709/201–203, 709/200, 206, 217, 212, 213, 227, 249; 707/513, 516, 530, 10, 3; 382/161

(56) References Cited

U.S. PATENT DOCUMENTS

| | | | |
|---|---|---|---|
| 5,572,643 A | | 11/1996 | Judson |
| 5,594,809 A | * | 1/1997 | Kopec et al. ................ 382/161 |
| 5,649,186 A | * | 7/1997 | Ferguson et al. ............. 707/10 |
| 5,706,507 A | | 1/1998 | Schloss |
| 5,708,825 A | | 1/1998 | Sotomayor |
| 5,721,827 A | * | 2/1998 | Logan et al. ................ 709/217 |
| 5,737,619 A | | 4/1998 | Judson |
| 5,745,909 A | * | 4/1998 | Perlman et al. ............. 707/513 |
| 5,757,925 A | * | 5/1998 | Faybishenko ................ 709/203 |
| 5,802,299 A | | 9/1998 | Logan et al. |
| 5,809,250 A | * | 9/1998 | Kisor ......................... 709/227 |
| 5,838,906 A | * | 11/1998 | Doyle et al. ................. 709/202 |
| 5,845,075 A | | 12/1998 | Uhler et al. |

(List continued on next page.)

OTHER PUBLICATIONS

Netscape Browser Plug–in; www.ncu.edu.tw/~center5/book/quebooks/netscap3/netch9.*

(List continued on next page.)

*Primary Examiner*—Mark R. Powell
*Assistant Examiner*—Thong Vu
(74) *Attorney, Agent, or Firm*—Patrick J. S. Inouye; Christopher J. Hamaty

(57) ABSTRACT

An Internet computer system with methods for dynamic filtering of hypertext tags and content is described. The system includes one or more Web clients, each operating a Web browser (e.g., Netscape Navigator or Microsoft Internet Explorer) with an Internet connection to one or more Web servers. Each client includes, interposed between its browser and communication layer, a Filter module of the present invention which traps and processes all communications between the browser and the communication layer. The Filter module, which implements client-side methodology at each individual Web client for dynamic filtering of hypertext tags and content, includes an output stream, a processing loop, a Filter method, and an input stream. During system operation, the Web browser generates multiple requests for retrieving content. More particularly, particular content is retrieved by a fetch or GET command (e.g., using HTTP protocol) transmitted to a target server from the client-side communication layer (e.g., Winsock driver). The command is, however, trapped by the Filter module. The "real" request or command is at this point processed by the Filter method of the Filter module. Accordingly, the system can modify the command, delete the command, synthesize new commands, or pass through unchanged the existing command. In an exemplary embodiment, the Filter method provides handlers for specific processing of various HTML (Hypertext Markup Language) tags, all operating according to user-configurable filtering preferences.

21 Claims, 4 Drawing Sheets

U.S. PATENT DOCUMENTS

| | | | | |
|---|---|---|---|---|
| 5,864,683 A | * | 1/1999 | Boebert et al. | 709/249 |
| 5,878,219 A | | 3/1999 | Vance, Jr. et al. | |
| 5,893,127 A | * | 4/1999 | Tyan et al. | 707/513 |
| 5,937,160 A | | 8/1999 | Davis et al. | |
| 5,956,484 A | | 9/1999 | Rosenberg et al. | |
| 5,987,480 A | * | 11/1999 | Donohue et al. | 707/501 |
| 6,009,441 A | * | 12/1999 | Mathieu et al. | 707/516 |
| 6,041,355 A | * | 3/2000 | Toga | 709/227 |
| 6,092,091 A | * | 7/2000 | Sumita et al. | 707/530 |

OTHER PUBLICATIONS

Tim Balls, Java in the Computing Curriculum. www.Imu.ac.uk/ies/comps/staff/iestjb/CTI–Java, Jan. 31, 1997.

Axel Boldt, WebFilter, http://math–www.uni–paderborn.de/~ axel/NoShit/, 1995.

Henrik Frystyk Nielsen. Rule FILE fILTER, www.w3.org/library/user/using/Rules.html, Dec. 1996.

JunkBuster Technical Information. www.junkbusters.com/ht/en/ijbman.html#java, 1996.

Steve Grant, Web Filter, http://ils.unc.edu/gants/report.html, Apr. 10, 1995.

Edith Au et al., Java Programming Basic, 1996.

* cited by examiner

INTERNET COMPUTER SYSTEM WITH METHODS FOR DYNAMIC FILTERING OF HYPERTEXT TAGS AND CONTENT

The present application is a continuation of commonly-owned patent application Ser. No. 08/815,164, filed Mar. 11, 1997 now U.S. Pat. No. 6,122,657 issued Sep. 19, 2000, which claims priority from commonly owned provisional patent application Ser. No. 60/037,161 filed Feb. 4, 1997, the disclosures of which are hereby incorporated by reference and the priority filing dates of which are claimed.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present application relates generally to use of a computer with the Internet and, more particularly, methods for speeding up the process of browsing Web content in a computer system having an Internet or other on-line browser.

With the ever-increasing popularity of the Internet, particularly the World Wide Web ("Web") portion of the Internet, more and more personal computers (PC's) provide Internet access to vast stores of information through Web "browsers" (e.g., Microsoft Internet Explorer or Netscape Navigator) or other "Internet applications." Browsers and other Internet applications includes the ability to access a URL (Universal Resource Locator) or "Web" site. The URL is used to specify the location of a file held on a remote machine.

Each URL itself is composed of several distinct components. For example, the URL http://host/file.html includes three distinct components. The first component, http, specifies the protocol (here, "HTTP" or HyperText Transfer Protocol) that is to be used to access the target file. Other access protocols can be specified by a URL. For example, the URL of ftp://ftp.pgp.com/pub/docs/samples specifies access to files via "FTP" (File Transfer Protocol). This specifies a link for accessing the file directory docs/samples on the machine ftp.pgp.com.

The second component, host, indicates the name of the remote machine; this can be expressed as either a symbol name (e.g.,pgp.com) or a numeric IP (Internet Protocol) address such as 123.200.1.1. The final component, file.html, provides the path name of the target file—that is, the file which the hypertext link is to be made. The file is referenced relative to the base directory in which Web pages are held; the location of this directory is specified by the person who has set up the Web server (i.e., "Webmaster").

The majority of content available on the Internet is represented in "HTML" documents which, in turn, are read or accessed by Web browsers. In particular, the HTML or Hypertext Markup Language is the scripting language used to create the documents for the World Wide Web. Although most browsers will display any document that is written in plain text, HTML documents afford several advantages. In particular, HTML documents include formatting, graphics, and "hypertext links" to other documents.

Markup languages are used to describe the structure of the document. HTML is used to mark various elements in a document, including headings, paragraphs, lists, tables, and the like. To achieve this, an HTML document includes formatting commands or "tags" embedded within the text of the document which serve as commands to a browser. Here, HTML tags mark the elements of a file for browsers. Elements can contain plain text, other elements, or both. The browser reading the document interprets these markup tags or commands to help format the document for subsequent display to a user. The browser thus displays the document with regard to features that the viewer selects either explicitly or implicitly. Factors affecting the layout and presentation include, for instance, the markup tags used, the physical page width available, and the fonts used to display the text.

The design of HTML tags is relatively simple. Individual HTML tags begin with a <("less than") character and end with a > ("greater than") character, such as <title> which serves to identify text which follows as the title of a document. HTML tags are not case-sensitive (with the exception of HTML escape sequences) and are often used in symmetric pairs, with the final tag indicated by the inclusion of a / (slash) character. For instance, the <title> tag represents a beginning tag which would be paired with a </title > ending tag. These paired commands would thus be applied to the text contained within the beginning and ending commands, such as <title> My Sample Title </title >. The <B > tag, on the other hand, informs browsers that the text which follows is to be in bold type. This bolding is turned off by the inverse markup tag </B >. In contrast to these paired or "container" tags, separator tags are used unpaired. For example, the command <br> is employed by itself to insert a line break. Browsers generally ignore extra spaces and new lines between words and markup tags when reading the document. In other words, "white space" characters, such as tabs, spaces, and new line characters, are generally ignored in HTML. Leaving a blank line in one's document, for instance, generally does not create a blank line when the document is displayed in a browser, unless one uses the "preformatted" HTML tag (<pre> and </pre>). Finally, not all tags are supported by all Web browsers. If a browser does not support a tag, it (usually) just ignores it.

The attraction of the World Wide Web is of course the "rich" content which it stores, largely as a collection of these interconnected Web or HTML pages. With each passing day, the information content available on the Web is more and more graphical in nature (e.g., high use of bitmaps). Accompanying the explosive growth of the World Wide Web, for instance, is the ever increasing use of advertising material on practically any content which a user can access. This is particularly problematic since advertising material is often graphically intensive, requiring substantial time and resources for downloading and processing. Apart from advertising, many Web sites employ graphics to such an extreme degree as to render it difficult or impractical to access the Web site in real-time unless one has a high-speed Internet connection (e.g., T1 line). All told, the total download times for Web pages is becoming increasingly greater.

At the same time, the underlying infrastructure of the Web has not improved to a sufficient degree to offset this increased resource demand. Although advertising on the Web serves as one example, there exists a more general problem of how a user of the Web can exert at least some control over the content which is downloaded into his or her browser. Accordingly, there is great interest in developing techniques which speed up the process of browsing Web content or "Web surfing," including decreasing the background noise (e.g., ancillary graphics) which are not desired by the user.

SUMMARY OF THE INVENTION

An Internet computer system with methods for dynamic filtering of hypertext tags and content is described. The system includes one or more Web clients, each with an Internet connection to one or more Web servers. An exemplary Web client comprises a personal computer or workstation operating a Web browser (e.g., Netscape Navigator or Microsoft Internet Explorer) which communicates with the Internet via a communication layer, such as Microsoft Winsock (Winsock.dll)—a Windows implementation of TCP/IP Transmission Control Protocol/Internet Protocol (TCP/IP).

At each client, interposed (functionally) between the browser and the communication layer is a Filter module of the present invention. In this fashion, the Filter module can trap and process all communications between the browser and the communication layer. For a client employing a Winsock 2 communication driver, the Filter module can register itself with the Winsock driver directly and, thereby, provide trapping and processing of communication in a manner which has the native support of the driver.

The Filter module, which implements client-side methodology at each individual Web client for dynamic filtering of hypertext tags and content, includes an output stream, a processing loop, a Filter method, and an input stream. For assisting with user configuration of its operation, the Filter module also includes a graphical user interface (GUI) administration module. The input stream is responsible for getting input; it interfaces directly with the Winsock communication driver. In a corresponding manner, the output stream communicates with the (client) browser; it is responsible for providing output to the browser which is to be ultimately rendered on screen for the user. Accordingly, the output stream represents the data pool right before it is sent to the browser. The Filter method, on the other hand, represents the workhorse method or core logic for performing the filtering.

At a high level, the Filter module operates as follows. The Web browser retrieves content by generating requests for content. More particularly, a fetch or GET request or command (e.g., using HTTP protocol) is issued through the Winsock communication driver, for example, for fetching particular content (e.g., bitmaps) specified by a Web page. The command is, however, first trapped by the Filter module. The "real" request or command is at this point processed by the Filter method. At the level of the Filter method, the system can modify the command, delete the command, synthesize new commands, or pass through unchanged the existing command, thereby impacting how the system renders Web pages. In an exemplary embodiment, the Filter method provides handlers for specific processing of various HTML tags, all operating according to user-configurable filtering preferences.

DETAILED DESCRIPTION OF A PREFERRED EMBODIMENT

The following description will focus on the presently-preferred embodiment of the present invention, which is operative in an Internet application (e.g., Web browser) running under the Microsoft® Windows environment. The present invention, however, is not limited to any particular one application or any particular environment. Instead, those skilled in the art will find that the system and methods of the present invention may be advantageously applied to a variety of system and application software, including database management systems, word processors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1:
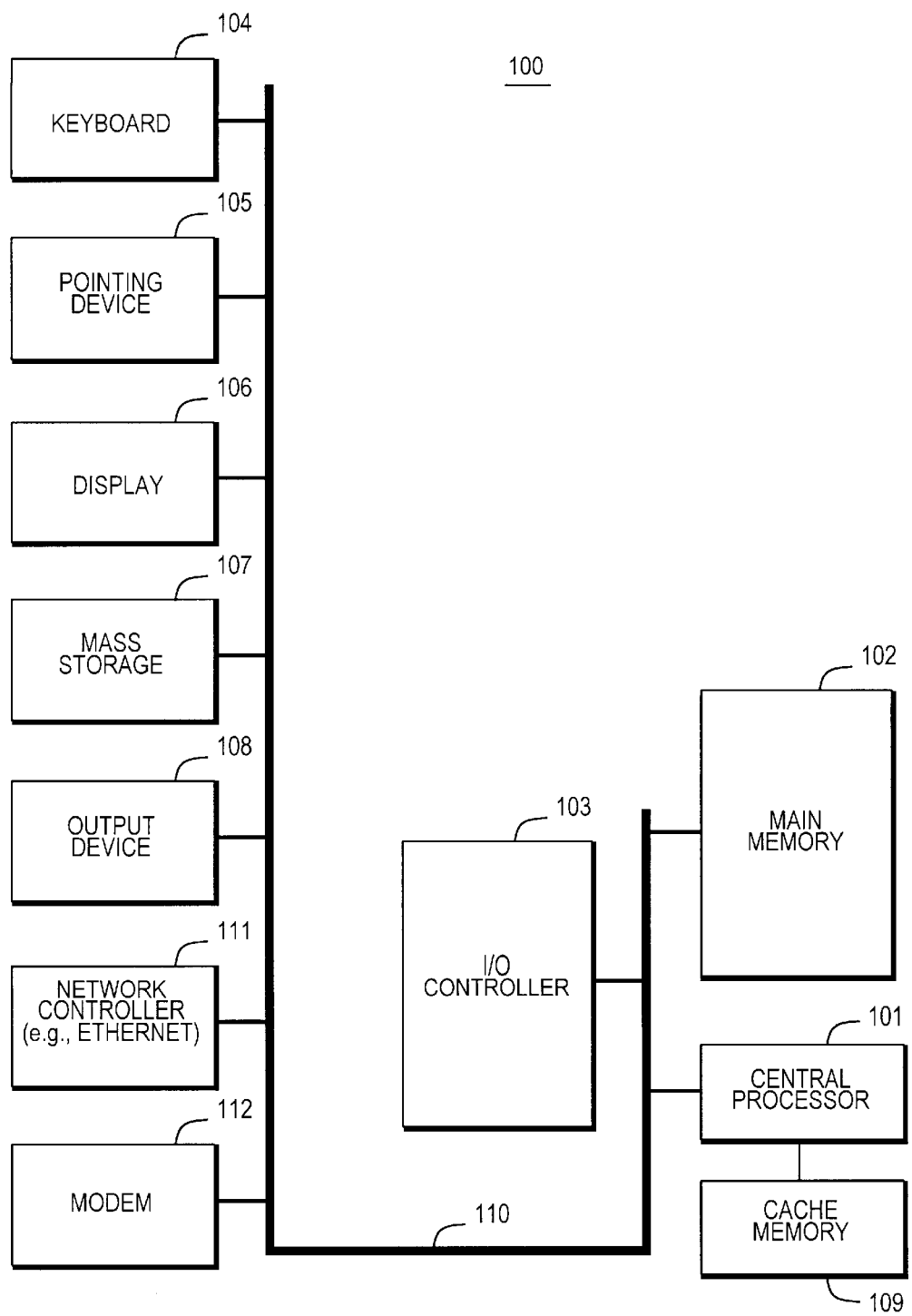
FIG. 1 is a block diagram illustrating a computer system in which the present invention may be embodied.

The invention may be embodied on a computer system such as the system 100 of FIG. 1, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory), a network interface card or controller 111 (e.g., Ethernet), and a modem 112 (e.g., 28.8K baud modem or ISDN modem). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. The system itself communicates with other systems via a network interface card 111 (e.g., available from 3Com) and/or modem 112 (e.g., available from U.S. Robotics). In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

Figure 2A:
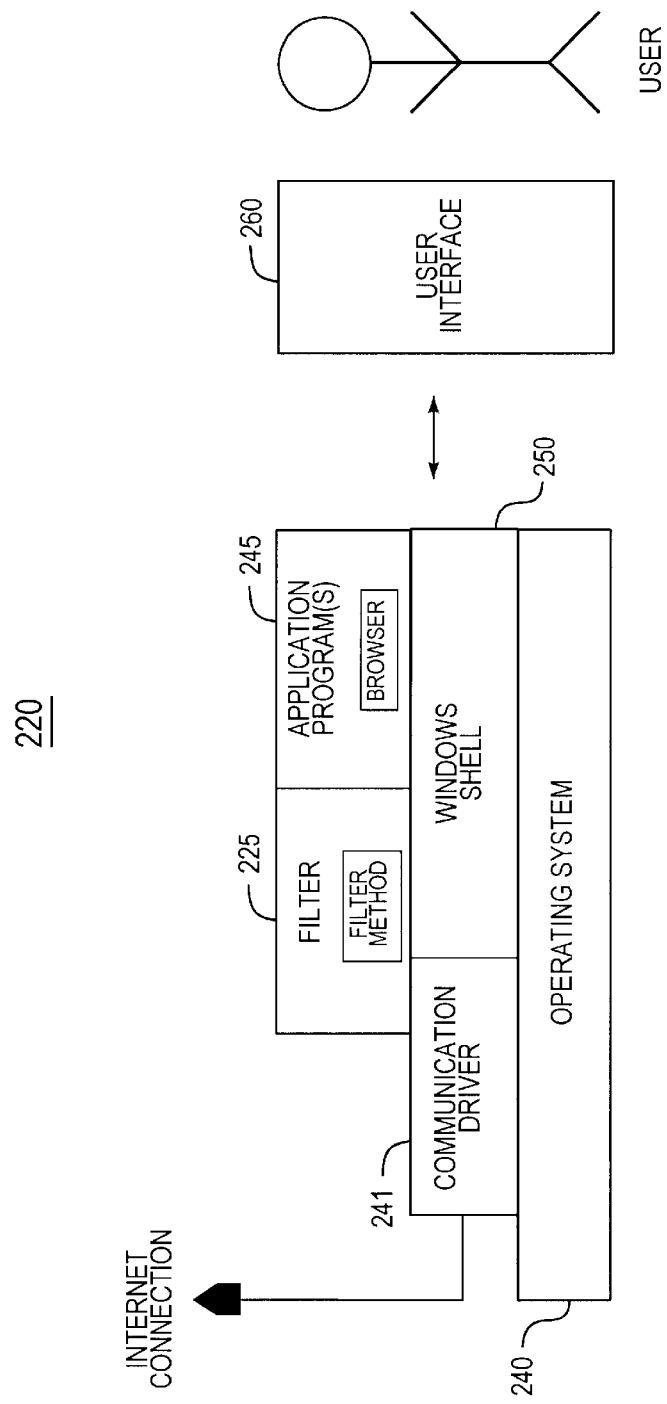
FIG. 2A is a block diagram of a computer software system for controlling the operation of the computer system of FIG. 1.

Illustrated in FIG. 2A, a computer software system 220 is provided for directing the operation of the computer system 100. Software system 220, which is stored in system memory 102 and on storage (e.g., disk memory) 107, includes a kernel or operating system (OS) 240 and a windows shell 250. One or more application programs, such as client application software or "programs" 245 may be "loaded" (i.e., transferred from storage 107 into memory 102) for execution by the system 100. In a preferred embodiment, client application software includes a Web browser (e.g., Netscape Navigator or Microsoft Internet Explorer) which communicates through a communication layer or driver 241 (e.g., Winsock) with the Internet.

System 220 includes a user interface (UI) 260, preferably a Graphical User Interface (GUI), for receiving user commands and data. These inputs, in turn, may be acted upon by the system 100 in accordance with instructions from operating module 240, windows 250, and/or client application module(s) 245. The UI 260 also serves to display the results of operation from the OS 240, windows 250, and application (s) 245, whereupon the user may supply additional inputs or terminate the session. OS 240 and windows 245 can be provided by Microsoft®Windows 95, by Microsoft® Windows NT, or by Microsoft Windows 3.x (operating in conjunction with MS-DOS); these are available from Microsoft Corporation of Redmond, Wash. Alternatively, OS 240 and windows 245 can be provided by IBM OS/2 (available from IBM of Armonk, N.Y.) or Macintosh OS (available from Apple Computers of Cupertino, Calif.). Although shown conceptually as a separate module, the UI is typically provided by interaction of the application modules with the windows shell, both operating under OS 240.

Of particular interest, the system 220 includes a Filter module 225 of the present invention. The Filter 225 manages content of Web pages downloaded from the Internet (or Intranet) by a user, according to user-configurable filter settings. Construction and operation of the Filter 225 of the present invention will now be described in further detail.

Methodology for Dynamic Filtering of HTML Tags and Content

A. HTML documents and client/server HTTP communication

Before describing construction of the Filter module of the present invention in further detail, it is helpful to first review in further detail both the internal organization of HTML documents and the operation of HTTP protocol for transmitting HTML documents to Web clients.

1. Organization of HTML Documents

Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications.

The basic layout of an HTML document, including required elements, is illustrated in the following simple HTML document.

```
<HTML>
<HEAD>
<TITLE>Title of the Web page </TITLE>
</HEAD>
<BODY>
An example of a simple
<B>Web</B>
page.
</BODY>
</HTML>
```

As illustrated, required elements include the <HTML>, <HEAD>, <TITLE>, and <BODY> tags, together with any corresponding end tags. The tags used function as follows. The first pair of tags, <HTML></HTML>, defines the extent of the HTML markup text. The <HEAD></HEAD> tag pair contains descriptions of the HTML page; this meta information is not displayed as part of the Web page. The <TITLE></TITLE> tag pair describes the title of the page. This description is usually displayed by the browser as the title of the window in which the Web page is displayed. This information is also used by some search engines to compile an index of Web pages. The next tag pair, <BODY></BODY>, delimits the body of the Web page. In the body is the text to be displayed as well as HTML markup tags to hint at the format of the text. For example, the <B></B> tag pair displays the enclosed text in a bold typeface. Further description of HTML documents is available in the technical and trade literature; see e.g., Ray Duncan, Power Programming: An HTML Primer, PC Magazine, Jun. 13, 1995, the disclosure of which is hereby incorporated by reference.

2. HTTP Communication

HTTP is the foundation of the World Wide Web. This request/response protocol used on top of TCP (Transmission Control Protocol) carries commands from browsers to servers and responses from servers back to browsers. HTTP is not a protocol, not for transferring hypertext per se, but for transmitting information with the efficiency necessary to make hypertext jumps. The data transferred by the protocol can be plain text, hypertext, audio, images, or any Internet-accessible information.

HTTP is a transaction-oriented client/server protocol; it treats each transaction independently. A typical implementation creates a new TCP connection between a client and a server for each transaction, then terminates the connection as soon as the transaction completes. Since the protocol does not require this one-to-one relationship between transaction and connection lifetimes, however, the connection can stay open so that more transactions can be made.

The transaction-based approach of HTTP is well-suited to its typical application. A normal Web session involves retrieving a sequence of pages and documents. The sequence is, ideally, performed rapidly, and the locations of the various pages and documents may be widely distributed among a number of servers, located across the country or around the globe.

In typical HTTP configuration, a client, such as a Web browser, initiates a request (HTTP message) for a resource, for instance, from a Web server where a desired home page is located. The client opens a direct connection that is end-to-end or direct connection between the client and the server. The client then issues an HTTP request. The request consists of a specific command (referred to as a method), a URL, and a message containing request parameters, information about the client, and perhaps additional content information. When the server receives the request, it attempts to perform the requested action and returns an HTTP response. The response includes status information, a success/error code, and a message containing information about the server, information about the response itself, and possible body content. The TCP connection is then closed.

Instead of the end-to-end TCP connection between a client and a server, an alternative configuration employs one or more intermediary systems with TCP connections between (logically) adjacent systems. Each intermediary system acts as a relay, so that a request initiated by the client is relayed through the intermediary system(s) to the server, and the response from the server is relayed back to the client. A "proxy," for example, is an intermediary system which acts on behalf of other clients and presents requests from other clients to a server. There are several scenarios that call for the use of a proxy. In one scenario, the proxy acts as an intermediary through a firewall. In this case, the server must authenticate itself to the firewall to set up a connection with the proxy. The proxy accepts responses after they have passed through the firewall.

Clients and servers communicate using two types of HTTP messages: request and response. A request message is sent by a client to a server to initiate some action. Exemplary actions include the following.

| | |
|---|---|
| GET: | A request to fetch or retrieve information. |
| POST: | A request to accept the attached entity as a new subordinate to the identified URL. |
| PUT: | A request to accept the attached entity and store it under the supplied URL. This may be a new resource with a new URL, or it may be a replacement of the contents of an existing resource with an existing URL. |
| DELETE: | Requests that the origin server delete a resource. |

The server, in response to a request, returns a response message. A response message may include an entity body containing hypertext-based information. In addition, the response message must specify a status code, which indicates the action taken on the corresponding request. Status codes are organized into the following categories:

| | |
|---|---|
| INFORMATIONAL: | The request has been received and processing continues. No entity body accompanies this response. |
| SUCCESSFUL: | The request was successfully received, understood, and accepted. |
| REDIRECTION: | Further action is required to complete the request. |
| CLIENT ERROR: | Request contains a syntax error or request cannot be fulfilled. |
| SERVER ERROR: | The server failed to fulfill an apparently valid request. |

Further description of HTTP is available in the technical and trade literature; see e.g., William Stallings, The Backbone of the Web, BYTE, October 1996, the disclosure of which is hereby incorporated by reference. As the explosive growth of the Web continues, and as new features are added to both browsers and servers, a standardized transfer protocol is essential to maintain the Web's growing functions and interoperability. HTTP provides the standardized definition required to meet these needs.

B. Approaches to Filtering

One approach to addressing the problem of spurious Web content is to adopt a server-based solution. For instance, one approach would be to employ a "proxy server" with the capability to perform text-based parsing (e.g., using PERL or AWK text processing). That approach is problematic, however. In particular, the proxy server (or set of proxy servers) presents a bottleneck through which Web content would have to be funneled. In addition to resource limitations (e.g., limited bandwidth), the approach also raises the issue of content ownership, such as the issue of mirror storage of copyrighted content at a proxy server.

Figure 2B:
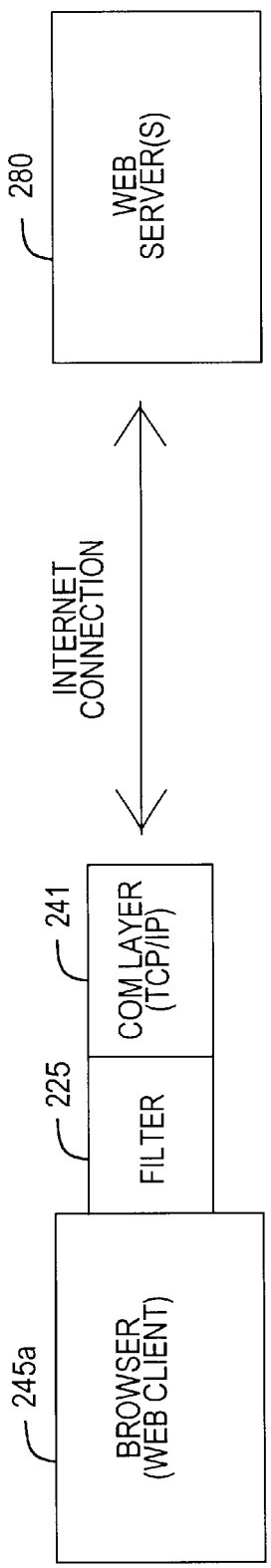
FIG. 2B is a block diagram illustrating implementation of a client-side approach to HTML filtering, at each individual Web client.

A better approach, therefore, is a client-side solution, one which can be implemented at each individual Web client. FIG. 2B is a block diagram illustrating the approach. The figure illustrates a Web client 245a with an Internet connection to one or more Web servers 280. More particularly, the client 245a comprises a Web browser (e.g., Netscape Navigator or Microsoft Internet Explorer) operating on a personal computer (e.g., system 100) or workstation which communicates with the Internet via a communication layer 241, such as Microsoft Winsock (Winsock.dll)—a Windows implementation of Transmission Control Protocol/Internet Protocol (TCP/IP). Interposed (functionally) between the browser 245a and the communication layer 241 is the Filter module 225 of the present invention. In this fashion, the Filter module 225 can trap and process all communications between the browser 245a and the communication layer 241. With the advent of Winsock 2 (Microsoft Corp. of Redmond, Wash.), a third party module can register itself with the Winsock driver and, thereby, trap and process communication in a manner which has the support of the driver.

C. Filter Module

1. Internal Architecture

Figure 3:
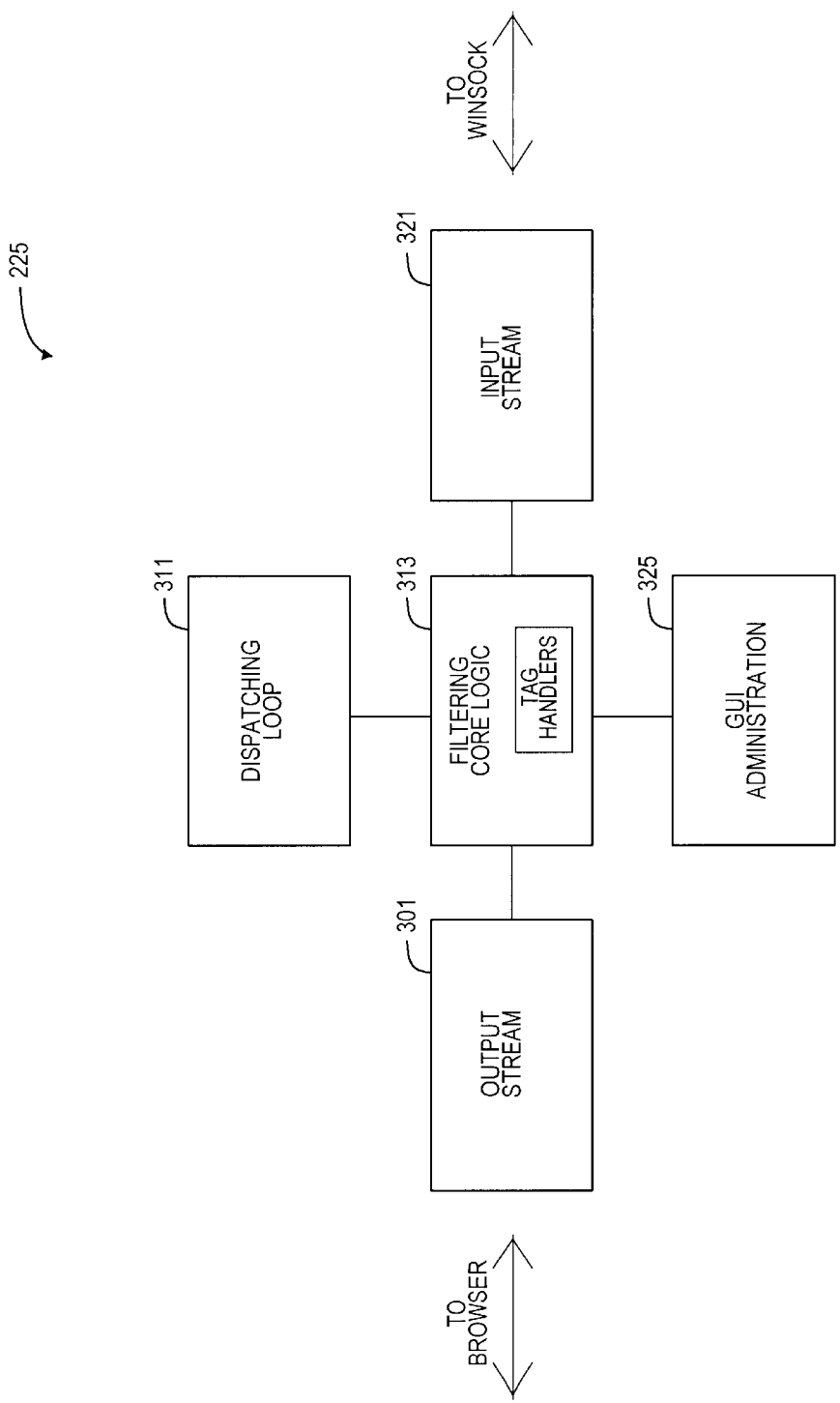
FIG. 3 is a block diagram illustrating detailed internal architecture of a Filter module of the present invention.

FIG. 3 is a block diagram illustrating detailed internal architecture of the Filter module 225. As shown, the Filter module 225 includes an output stream 301, a dispatching loop 311, Filter logic 313, and an input stream 321. For assisting with user configuration of its operation, the Filter module 225 includes a graphical user interface (GUI) administration module 325. The input stream 321 is responsible for getting input; it interfaces directly with the Winsock communication driver. In a corresponding manner, the output stream 301 communicates with the (client) browser; it is responsible for providing output to the browser which is to be ultimately rendered on screen for the user. Accordingly, the output stream 301 represents the data pool right before it is sent to the browser. The Filter logic 313, on the other hand, represents the workhorse or core module for performing the actual filtering. Its functionality is described in further detail below.

At a high level, the module 225 operates as follows. The Web browser operates by generating requests for content, both for retrieving an initial Web page as well as for retrieving objects (e.g., bitmaps) intended for display on the page. In operation, the system issues fetch or GET commands, which are communicated to the server via the communication driver. Any such command is, however, trapped by the Filter module 225. The "real" request is at this point processed by the Filter core logic (Filter method) 313. At this point, the system can modify the command, delete the command, synthesize new commands, or pass through unchanged the existing command.

2. Filter Construction

The detailed construction of the Filter core logic 313 is as follows. The Filter is implemented as a C language routine having an internal message or dispatcher loop which "switches" on different (HTML) tag types. Based on the particular tag being processed, the loop in turn dispatches the information to a particular handler, for performing the desired processing on that HTML tag type. As the example of this approach, consider, for instance, the processing of an image tag type. Upon encountering an image tag, the system dispatches the tag to the appropriate handler, an image tag handler. At this point, the handler can now proceed to process the information. For instance, the image handler could determine whether the image tag includes a reference to material which is to be filtered (e.g., the image tag references an image stored in a "/ad/" directory). In the event that the handler "kills" the tag, the system employs a "kill" routine for correctly managing the buffer, including incrementing the current buffer position beyond the tag (so that it can locate the next tag). Alternatively, the system can synthesize new tags, or pass through unchanged the existing tags.

Certain tag types require more complex processing. Consider, for instance, a href or "hyper reference" tag type, which is employed for establishing a hyperlink. An instruction to kill an href tag is, instead, an instruction to kill the image contained within the href tag. Accordingly, the corresponding handler must include logic not for killing the href tag but, instead, for setting a status flag indicating that the system should cycle through (in the dispatcher loop) the tag and kill the image tag contained within the href tag.

3. Filter Methodology

In accordance with the present invention, the Filter comprises a core routine the Filter method—for providing filtering finctionality. In an exemplary embodiment, the Filter method may be constructed as follows (e.g., in the C programming language).

```
1: int Filter (char *Buffer, char *BaseURL, int BuffSize, BOOL CRCOn, BOOL *
2:              INJavaScript, BOOL * KillNextIMG)
3:      {
4:          int decrement_val;       // How much for the next buffer receive
5:          char * Found;            // Where was it found
6:          char * IMGFound;         // Where was it found
7:          char * BlinkFound;       // Where was it found
8:          char * JavaFound;
9:          char * ScriptFound;
10:         char * HREFFound;
11:         char * Full_Tag;
12:         char * Left_Less_Than;          // Keep up with that left greater than....
13:         char * Right_Greater_Than;      // Keep up with the other tag...
14:         char * Found_IMG_URL;           // found img url...
15:         char* THE_END = Buffer + BuffSize; // The real end of the buffer
16:         char * getstring;
17:         int Length;
18:         int count=0;
19:         int DoKill;              // Are we at the end of the buffer
20:         pURL imgURL_struct;
21:         pURL Base_URL;
22:         DWORD Xor;               // DWORD to do the XOR compare
23:         SOCKET hControlChannel;  // Socket handle for the control channel
24:         HFILE hFile;             // Handle for gif download save file
25:         BOOL Bad_Tag;
26:         Chunk imgloc;
27:         Chunk javabinloc;
28:         int imgsize;
29:
30:
31: imgURL_struct = (pURL) malloc (sizeof (URL));
32: if ( imgURL_struct == NULL)
33: {
34: MessageBox(NULL, "Malloc Failed in Filter(),
35: imgURL_struct\nExpect a Crash!",
36: "Malloc Failed", MB_OK|MB_ICONSTOP);
37: }
38: Base_URL = (pURL) malloc (sizeof (URL));
39: if ( Base_URL == NULL)
40: {
41: MessageBox(NULL, "Malloc Failed in Filter(), Base_URL\nExpect a Crash!",
42:        "Malloc Failed", MB_OK|MB_ICONSTOP);
43: }
44:
45: // SpawnOnOff = 1;   /* use for testing */
46:
47: //////////////////////////////////////////////////
48: //
49: //    In Java Script situation stuff
50: //
51: //////////////////////////////////////////////////
52:
53:         if (*INJavaScript)
54:         {
55:
56:             ScriptFound = strstri (Buffer, "/script");
57:             if (ScriptFound == NULL) // didn't find the end
58:             {
59:                 Right_Greater_Than = (char *)memchr(Buffer, '<', (THE_END - Buffer));
60:                 if (Right_Greater_Than == NULL)
61:                 {
62:                     decrement_val =   (THE_END - Buffer);
63:                     *INJavaScript = FALSE;
64:                     if (Base_URL)
65:                         free (Base_URL);
66:                     if (imgURL_struct)
67:                         free (imgURL_struct);
68:                     return decrement_val; //RETURN
69:                 }
70:                 Buffer = Right_Greater_Than – 1;
71: #ifdef scriptd
72: vErrorOut (fg_pink, "INJavaScript = False due to no Found /script and a found >\n");
73: #endif
```

-continued

```
74:             *INJavaScript = FALSE;
75:         }
76:         else
77:         {
78: #ifdef scriptd
79: vErrorOut (fg_pink, "INJavaScript = False due found /script\n");
80: #endif
81:             *INJavaScript = FALSE;
82:             Buffer = ScriptFound + 7;// just move on past the /script...
83:         }
84:     }
85: /////////////////////////////////////////
86:
87:
88:     while (TRUE)
89:     {
90:
91:
92:     Xor = 0;
93:     imgsize = 0;
94:     Found = NULL;
95:     IMGFound = NULL;
96:     BlinkFound = NULL;
97:     JavaFound = NULL;
98:     HREFFound = NULL;
99:     ScriptFound = NULL;
100:    Full_Tag = NULL;
101:    Bad_Tag = FALSE;
102:    Left_Less_Than = (char *)memchr (Buffer, '<', (THE_END - Buffer + 1));
103:        if (Left_Less_Than == NULL)
104:        /* Can't find a tag in the text at all -- This means we are done */
105:        {
106:            if (Base_URL)
107:                free (Base_URL);
108:            if (imgURL_struct)
109:                free (imgURL_struct);
110:
111:            return 0; //RETURN
112:        }
113:
114:
115:    if (*(Left_Less_Than+1) == '!'
116:        && *(Left_Less_Than+2) == '-'
117:        && *(Left_Less_Than+3) == '-'
118:    {
119:    Right_Greater_Than = strstr (Left_Less_Than, "-->");
120:    if (Right_Greater_Than == NULL)
121:        {
122:        Right_Greater_Than
123:        = (char *)memchr(Left_Less_Than, '>', (THE_END - Left_Less_Than));
124:        if (Right_Greater_Than == NULL)
125:            {
126:            decrement_val = (THE_END - Left_Less_Than);
127:            if (decrement_val > 0)
128:                {
129:                if (Full_Tag)
130:                    free (Full_Tag);
131:                if (Base_URL)
132:                    free (Base_URL);
133:                if (imgURL_struct)
134:                    free (imgURL_struct);
135:                return 0;    //RETURN
136:                }
137:
138:            if (Full_Tag)
139:                free (Full_Tag);
140:            if (Base_URL)
141:                free (Base_URL);
142:            if (imgURL_struct)
143:                free (imgURL_struct);
144:
145:            return decrement val;    //RETURN
146:            }
147:        }
148:    Right_Greater_Than +=2;
149:    /* Buffer is going to be assigned Right_Greater_Than + 1 */
150:    IMGFound = NULL;
151:    /* This is to cause a break and a continue to the next buffer */
152:    }
```

-continued

```
153: ////////////////
154: else // Its not a comment
155:     {
156:     Right_Greater_Than
157:         = (char *)memchr(Left_Less_Than, '>', (THE_END - Left_Less_Than));
158:     if (Right_Greater_Than == NULL)
159:     /* if Couldn't find a right side to the current tag
160:        We are done but have stuff hanging
161:     */
162:         {
163:         decrement_val = (THE_END - Left_Less_Than);
164:         if (decrement_val > 0)
165:             {
166:             if (Full_Tag)
167:                 free (Full_Tag);
168:             if (Base_URL)
169:                 free (Base_URL);
170:             if (ImgURL_struct)
171:                 free (imgURL_struct);
172:             return 0;    //RETURN
173:             }
174:         if (Full_Tag)
175:             free (Full_Tag);
176:         if (Base_URL)
177:             free (Base_URL);
178:         if (imgURL_struct)
179:             free (imgURL_struct);
180:
181:         return decrement_val;    //RETURN
182:         }
183:     Length = (Right_Greater_Than - Left_Less_Than + 2);
184:     Full_Tag = (char *)malloc(Length + 2);
185:     if ( Full_Tag == NULL)
186:         {
187:         MessageBox(NULL, "Malloc Failed in Filter(), Full_Tag\nExpect a Crash!",
188:             "Malloc Failed", MB_OK|MB_ICONSTOP);
189:         }
190:     lstrcpyn (Full_Tag, Left_Less_Than, (Length));
191: }
192: //
193: // TAG HAS BEEN FOUND!!!!!
194: //
195: ////////////////
196: IMGFound = strstri ((char *)Full_Tag, "img");
197: /* Actually try to find the image.... */
198: if (IMGFound == NULL)
199:     {
200:     Buffer = Right_Greater_Than +1;
201:     *KillNextIMG = FALSE;
202:     if (Full_Tag != NULL)
203:         {
204:         BlinkFound = strstri ( (char *)Full_Tag, "blink");
205:         JavaFound = strstri ( (char *) Full_Tag, "applet");
206:         ScriptFound = strstri ( (char *) Full_Tag, "script");
207:         HREFFound = strstri ( (char *) Full_Tag, "href");
208: //      FrameFound = strstri ( (char *) Full_Tag, "frameset");
209:         CheckForBase (Full_Tag, BaseURL);
210:         }
211: //    else
212:
213:
214:
215:
216: // Tag processing
217:
218: ////////////////////////////////////////////////BLINK
219:     if (BlinkFound != NULL && BlinkOnOff)
220:         {
221:         count = (Right_Greater_Than - Left_Less_Than + 1);
222:         memset (Left_Less_Than, 0x20, (count));
223:         num_blink_killed++;
224: #ifdef debug
225:         vErrorOut (fg_blue, "Killed a blink tag\n");
226: #endif
227:         free(Full_Tag);
228:         }
229: ////////////////////////////////////////////////JAVA
230:     if (JavaFound != NULL && (*(char *) (JavaFound - 1) != '/') && AdsOnOff
```

-continued

```
231:            && !isalpha(*(JavaFound + 6)) && Full_Tag)    //found a java app
232:            {
233: #ifdef debug
234:            vErrorOut    (fg_green, "Found a Java App, it is %s\n", JavaFound);
235: #endif
236:            javabinloc.Found = (char *)Left_Less_Than;
237:            javabinloc.End = strstri ( Right_Greater_Than, "applet");
238:            if (javabinloc.End == NULL)
239:            {
240:                decrement_val =   (THE_END - Left_Less_Than);
241: #ifdef javad
242:            vErrorOut    (fg_green,
243:                "Decrement due to no found /applet, val is %d\n", decrement_val);
244:            MessageBox(NULL, javabinloc.Found,
245:                "Decrement due to no found /applet, content is",
MB_OK|MB_ICONSTOP);
246: #endif
247:                if (Full_Tag)
248:                    free (Full_Tag);
249:                if (Base_URL)
250:                    free (Base_URL);
251:                if (imgURL_struct)
252:                    free (imgURL_struct);
253: #ifdef returnd
254:            vErrorOut (fg_puke, "Returning due to no found /applet\n");
255: #endif
256:
257:                return decrement_val;    //RETURN
258:            }
259:            Right_Greater_Than
260:                = (char *)memchr(javabinloc.End, '>', (THE_END -
javabinloc.End));
261:            if (Right_Greater_Than == NULL)
262:            {
263:                decrement_val = (THE_END - Left_Less_Than);
264: #ifdet javad
265:            vErrorOut   (fg_green, "Decrement due to no found > after /applet, val
is %d\n", decrement_val);
266:            vErrorOut    (fg_green, "Decrement due to no found > after /applet\n");
267:            MessageBox (NULL, javabinloc.Found,
268:                "Decrement due to no found > after /applet, content is",
269:                MB_OK|MB_ICONSTOP);
270: #endif
271:                if (Full_Tag)
272:                    free (Full_Tag);
273:                if (Base_URL)
274:                    free (Base_URL);
275:                if (imgURL_struct)
276:                    free (imgURL_struct);
277: #ifdef returnd
278:            vErrorOut (fg_puke, "Returning due to no found > after
/applet\n");
279: #endif
280:                return decrement_val;    //RETURN
281:            }
282:            javabinloc.End = Right_Greater_Than;
283: #ifdef javad
284:            vErrorOut    (fg_green, "Going to compare java\n");
285: #endif
286:            if (KillJava((pChunk) &javabinloc)) // it is one to kill
287:            {
288: #ifdef debug
289:            vErrorOut    (fg_green, "Killed a Java App\n");
290: #endif
291:                count = (javabinloc.End - javabinloc.Found + 1);
292: //                Right_Greater_Than = javabinloc.End;
293:                memset (Left_Less_Than, 0x20, (count)); // write white space
294:                Buffer = Right_Greater_Than +1;
295:                num_ads_killed++;
296:                free(Full_Tag);
297:            }
298:            else
299:            {
300:                Buffer = Right_Greater_Than +1;
301:                if (Full_Tag)
302:                    free(Full_Tag);
303:            }
304:        }
305:
```

-continued

```
306:
307: ////////////////////////////////////JAVASCRIPT
308:
309:         if ((ScriptFound != NULL) && ((ScriptFound - Full_Tag) < 5) &&
310:              (*(ScriptFound - 1) != '/')
311:                  && !isalpha(*(ScriptFound + 6)) && Full_Tag)
312:
313:         {
314:              ScriptFound = strstri (Right_Greater_Than, "/script");
315:
316:              if (ScriptFound == NULL)
317:              {
318:                  decrement_val = (THE_END - Right_Greater_Than);
319: #ifdef scriptd
320: vErrorOut (fg_pink,"Decrement looking for /Script,size %d\n",decrement_val);
321: #endif
322:                  *INJavaScript = TRUE;
323:                  if (Full_Tag)
324:                      free (Full_Tag);
325:                  if (Base_URL)
326:                      free (Base_URL);
327:                  if (imgURL_struct)
328:                      free (imgURL_struct);
329: #ifdef returnd
330:                  vErrorOut   (fg_white, "Returning due to no found /script\n");
331: #endif
332:                  return decrement_val;   //RETURN
333:              }
334:              Right_Greater_Than = (char *)memchr(ScriptFound, '>', (THE_END - ScriptFound));
335:              if (Right_Greater_Than == NULL)
336:         {
337: #ifdef scriptd
338: vErrorOut   (fg_pink, "Decrement of 0 looking for > after /Script\n");
339: #endif
340:                  //decrement_val = (THE_END - ScriptFound) * -1;
341:                  decrement_val = 0;
342:                  if (Full_Tag)
343:                      free (Full_Tag);
344:                  if (Base_URL)
345:                      free (Base_URL);
346:                  if (imgURL_struct)
347:                      free (imgURL_struct);
348: #ifdef returnd
349:                  vErrorOut (fg_white, "Returning due to no found > after /script\n");
350: #endif
351:
352:                  return decrement_val;   //RETURN
353:         }
354: #ifdef scriptd
355: vErrorOut   (fg_red, " Found /Script, moving past and continuing filter\n");
356: #endif
357:         Buffer = Right_Greater_Than + 1;
358:         if (Full_Tag)
359:              free (Full_Tag);
360:
361:
362:     }
363: ///////HREF SEARCHING///////////////////////////////////////
364:
365:     if (HREFFound != NULL && Full_Tag)
366:     {
367:     if (AdsOnOff && !isalpha(*(HREFFound-1)) && !isalpha(* (HREFFound+4)))
368:         {
369:     SearchForEqual    (HREFFound, &imgloc);
370:         if (imgloc.Found != NULL && KillHref (&imgloc))
371:         {
372:         //MessageBox (NULL, Right_Greater_Than, "Whats Next", MB_OK|MB_ICONSTOP);
373:
374: /*     Found = strstri (Right_Greater_Than, "</a");
375:         if (Found)
376:         {*/
377:         *KillNextIMG = TRUE;
378:             //Found = Found -1;
```

-continued

```
379:            /*memset ((char *) (Right_Greater_Than + 1), 0x20, (Found -
Right_Greater_Than));
380:            num_ads_killed++;*/
381: #ifdef hrefd
382:            vErrorOut    (fg_red, "Killed an add based on HREF\n");
383:            //MessageBox (NULL, "Killed by HREF", "Killed by HREF",
MB_OK|MB_ICONSTOP);
384: #endif
385:            /*tempptr = (char *)memchr (Found, '>', 5);
386:            if (tempptr != NULL)
387:            {
388:            memset (Found, 0x20, (tempptr - Found + 1));
389:            istrcpyn ( (char *) (Right_Greater_Than + 1), "</a>", 5);
390:            }*/
391:            //}
392:        }
393: #ifdef hrefd
394:        vErrorOut (fg_unc_blue, "Leaving Href...\n");
395: #endif
396:
397:
398:    }
399:    if (SpawnOnOff)
400:    {
401:        Found = strstri ( (char *) HREFFound, "_blank");
402:        if (Found != NULL)
403:        {
404:
405:
406:            count = (Found - Full_Tag);
407:            memset ((Left_Less_Than + count), 0x20, 6);
408:            num_spawn_killed++;
409: #ifdef debug
410:        vErrorOut    (fg_blue, "Killed a spawn tag\n");
411: #endif
412:        if (Full_Tag)
413:            free(Full_Tag);
414:        }
415:
416:    }
417:
418:    }
419:
420: //////////////////////////////////////////////////
421: #ifdef fulltagd
422:    vErrorOut    (fg_green, "Found re-assigned Null\n");
423: #endif
424:    IMGFound = NULL;
425: //vErrorOut (fg_blue, "There was no image found in the tag\n");
426:    }
427:
428:
429: if (IMGFound != NULL)        // we have an img tag
430:    {
431:    if (*KillNextIMG)//Killed by href
432:        {
433:        delete_reference ( Left_Less_Than, Right_Greater_Than);
434:        num_ads_killed++;
435:        Bad_Tag = TRUE; //Done...
436:        *KillNextIMG = FALSE;
437:        }
438:    SearchForsrc ((char *)Full_Tag, &imgloc);
439:    /* returns imgloc.Found == NULL if its a problem */
440:    /* Need two pointers...
441:        End and Found for the left and right side of the image
442:    */
443:
444:    if (imgloc.Found == NULL)
445:        {
446:        Bad_Tag = TRUE;
447: #ifdef debug
448: vErrorOut    (fg_yellow, "There was an img tag but no src in :\n");
449: vErrorOut    (fg_yellow, "    %s\n", Full_Tag);
450: #endif
451:        }
452:
453:    if (!Bad_Tag)
454:        {
455:        Length = (imgloc.End - imgloc.Found + 2);
```

-continued

```
456:            count = (imgloc.Found - Full_Tag);
457:            Full_Tag += count;
458:            Found_IMG_URL = (char *) malloc (Length + 1);
459:            if (Found_IMG_URL == NULL)
460:                    {
461:                    if (Base_URL)
462:                            free (Base_URL);
463:                    if (imgURL_struct)
464:                            free (imgURL_struct);
465:                    if (Full_Tag)
466:                            free (Full_Tag);
467: #ifdef returnd
468:                    vErrorOut   (fg_white, "Returning due to bad Found_Img_URL
malloc\n");
469: #endif
470:
471:                    MessageBox(NULL,"Malloc Failed in filter(),Found_IMG_URL\nExpect a
crash!",
472:                            "Malloc Failed", MB_OK|MB_ICONSTOP);
473:                    return 0;    //RETURN
474:                    }
475:            lstrcpyn (Found_IMG_URL, Full_Tag, Length);
476:
477:            ParseURL (Found_IMG_URL, imgURL_struct); //Parse the IMG URL here
478:            ParseURL (BaseURL, Base_URL);
479:            free(Found_IMG_URL);
480:            Full_Tag -= count;
481:            free (Full_Tag);
482:
483: //Create a fully qualified imgURL_struct
484:            Bad_Tag = Compare_URLs (Base_URL , imgURL_struct);
485: #ifdef debug
486:            vErrorOut   (fg_yellow, "imgURL is:\n");
487: vErrorOut (fg_brite_green, "%s--%s\n", imgURL_struct->server,
imgURL_struct->URI);
488: #endif
489:            if (!Bad_Tag)
490:                    {
491:                    DoKill = CheckCache ( (char *) imgURL_struct->URI);
492:                    if (DoKill == 2)
493:                    {
494:                            if ((DoKill != 1) && PersonalOnOff)
495:                            {
496:                                    DoKill = LoopPersonFilt (imgURL_struct);
497:                            }
498:                            if ((DoKill != 1) && AdsOnOff)
499:                            {
500:                                    vErrorOut (fg_green, "Hacking\n");
501:                                    DoKill = Hack (imgURL_struct);
502:                                    vErrorOut (fg_yellow, "Back from the Hack!\n");
503:                            }
504:                    }
505:
506:            if ((!AdsOnOff && ImgSizeOnOff) || (ImgSizeOnOff && CRCOn == FALSE))
507:                    {
508: #ifdef debug
509:                    vErrorOut   (fg_white, "Starting a non-ad IMGsize kill check\n");
510: #endif
511:            hControlChannel=
ASYNCConnectWebServerSocket((LPSTR)imgURL_struct->server,
512:                            imgURL_struct->port);
513:            if (hControlChannel != INVALID_SOCKET)
514:                    {
515:                    hFile = ASYNCSendWebHeadQuery(hControlChannel,
(LPSTR) imgURL_struct->URI);
516:                    if (hFile != SOCKET_ERROR)
517:                            {
518:                            imgsize = ASYNCGetHeader(hControlChannel);
519: #ifdef debug
520:    vErrorOut (fg_white, "Non-ad IMGsize %d\n", imgsize);
521: #endif
522:                            if (imgsize > MaxImgSize)
523:                                    {
524:                                    num_size_killed++;
525:                                    delete_reference ( Left_Less_Than, Right_Greater_Than);
526:                                    IMGCache[nextcacheval].KILL = TRUE;
527:                                    IMGCache[nextcacheval].NonAd = TRUE;
528:                                    }
529:                            }
```

-continued

```
530:            }
531:
532:        }
533
534:            if (DoKill == 2 /*&& (strstri (imgURL_struct_server,
"netscape.com") == NULL) */
535:                && CRCOn && AdsOnOff)
536:                /* case 1 of cache - we don't have it in cache */
537:            {
538:                lstrcpyn (IMGCache[nextcacheval].URI, imgURL_struct->URI,
539:                    (strlen(imgURL_struct->URI)+1));
540: #ifdef async
541:                getstring = (char *)malloc (strlen(imgURL_struct->URI)+1);
542:                if ( getstring == NULL)
543:                {
544:                    MessageBox(NULL, "Malloc Failed in Filter(),
545:                        getstring\nExpect a Crash!",
546:                    "Malloc Failed", MB_OK|MB_ICONSTOP);
547:                }
548:
549:                strcpy (getstring, imgURL_struct->URI);
550:                /*if (Proxy)
551:                {
552:                    sprintf (getstring, "http://%s:%d%s", ProxyHost,
553:                        imgURL_struct.port, imgURL_struct.URI);
554:
555:                    hControlChannel =
ASYNCConnectWebServerSocket((LPSTR)ProxyHost,
556:                        ProxyPort);
557:
558:                }*/
559: vErrorOut (fg_white, "CRCing!!!!\n");
560:                hControlChannel =
ASYNCConnectWebServerSocket((LPSTR)imgURL_struct->server,
561:                    imgURL_struct->port);
562: /*#else
563:                hControlChannel =
564:                    ConnectWebServerSocket((LPSTR)imgURL_struct.server,
565:                        imgURL_struct.port);*/
566: #endif
567:                if (hControlChannel != INVALID_SOCKET)
568:                {
569:                    // If the control socket is valid, grab a file from the
site.
570: //#ifdef async
571:                    hFile = ASYNCSendWebQuery(hControlChannel,
(LPSTR)getstring);
572:                    if (getstring)
573:                        free (getstring);
574: /*#else
575:                    hFile = SendWebQuery(hControlChannel,
(LPSTR)imgURL_struct.URI);
576:                    */
577: //#endif
578:
579:                    if (hFile != SOCKET_ERROR)
580:                    // logged in; got a file to write to; okay to proceed.
581:                    {
582:
583: /*#ifdef async*/
584:                        Xor=ASYNCCheckEm(hControlChannel, (int *)&imgsize);
585: /*#else
586:                        Xor=CheckEm(hControlChannel);
587: #endif*/
588:
589: #ifdef debug
590: vErrorOut (fg_red, "Image Size is %d\n", imgsize);
591: vErrorOut (fg_cyan, "Back from Xor=CheckEm(hControlChannel) Xor is %lx\n",
Xor);
592: #endif
593:                    }
594:                    else if (hFile == SOCKET ERROR)
595:                    {
596: #ifdef debug
597: vErrorOut (fg_cyan, "hFile == SOCKET_ERROR\n");
598: #endif
599:                        Xor = 0;
600:                    }
601:                }//endif (hControlChannel != INVALID_SOCKET)
```

```
602:          else if (hControlChannel == INVALID_SOCKET)
603:             {
604: #ifdef debug
605: vErrorOut (fg_cyan, "hControlChannel == INVALID_SOCKET From
ConnectServerSocket\n");
606: #endif
607:             Xor = 0;
608:             }
609:
610:          if (ImgSizeOnOff && imgsize > MaxImgSize)
611:             {
612:             delete_reference ( Left_Less_Than, Right_Greater_Than);
613:             //Xor = 0;
614:             num_size killed++;
615:             IMGCache[nextcacheval].KILL = TRUE;
616:             IMGCache[nextcacheval].NonAd = TRUE;
617:             }
618:
619:          if (Xor != 0 && CompID (Xor, (DWORD *)&pAdsID))
620:             {
621:             num_ads_killed++;
622:             delete_reference ( Left_Less_Than, Right_Greater_Than);
623:             //count = (Right_Greater_Than - Left_Less_Than + 1);
624:
625:             //memset (Left_Less_Than, 0x20, (count));
626:             IMGCache[nextcacheval].KILL = TRUE;
627: #ifdef debug
628: lstrcpyn (szMsg, Left_Less_Than, (count));
629: vErrorOut (fg_purple, "We killed this tag : %s\n", szMsg);
630: #endif
631:             }
632:          else
633:             {
634:             IMGCache[nextcacheval].KILL = FALSE;
635:             }
636:          nextcacheval--;
637:          }//end 'not found in cache'
638:       else if (DoKill == 1)
639:          {
640:          if (IMGCache[nextcacheval].NonAd == FALSE)
641:             num_ads_killed++;
642: #ifdef debug
643: vErrorOut (fg_unc_blue, "The image was in the cache to be killed\n");
644: //          lstrcpyn (szMsg, Left_Less_Than, (count));
645: #endif
646:          delete_reference ( Left_Less_Than, Right_Greater_Than);
647:          }
648:       else
649:       // The image was in the cache and didn't have to be checked or
added
650:          {
651:          // vErrorOut(fg_green,"The image was in the cache
652:          // It didn't have to be checked and was not added\n");
653:          }
654:       }//endif (!Bad_Tag)
655:
656:
657:       Buffer = Right_Greater_Than + 1;
658:       }//endif (!Bad_Tag)
659:
660:       if (Bad_Tag)
661:          {
662:       Buffer = Right_Greater_Than + 1;
663:       }
664:       Buffer = Right_Greater_Than + 1;
665:       }
666:    }//end of while loop
667:
668: }
```

The description which follows will focus on the use of the Filter for deleting or "killing" unwanted tags, such as image tags (and image content contained therein). Those skilled in the art will appreciate that once tags have been fully qualified, in accordance with the methodology described herein, identified tags (commands) can be modified (e.g., to point to a new URL, or to contain new content), replaced with new tags (e.g., replacing "blink" tags with "bold" tags synthesized on-the-fly), or simply passed through unchanged.

The Filter method or routine is invoked by the output stream, an internal client responding to requests of the browser. The method is invoked with six parameters. The first parameter, Buffer, is a pointer to the memory buffer containing the data of interest—that is, the raw buffer received from the network. The second parameter, BaseURL, comprises a (pointer to) character string storing the base URL (address) of the page for the request. If the page were Netscape's home page, for instance, the base URL data member would point to www.netscape.com as the base URL string. The third parameter, BuffSize, simply stores the size of the buffer; it is used for housekeeping purposes.

The fourth parameter, CRCOn, is a Boolean data member indicating whether Cyclic Redundancy Checking (CRC)—a well-known checksum technique—is activated; a simple checksum can be constructed, for instance, by simply adding all the units together which comprise the content of interest, such as adding together all of the byte values of a particular image in an HTML document. The CRC checksum is used to control certain conditional branches of the Filter routine. The fifth parameter, INJavaScript, is a (pointer to) Boolean which can be modified within the Filter method. INJavaScript addresses the following problem. When the current buffer is entirely a tag of type <script> (which can be 3–5K in length), the tag might require multiple passes (e.g., three passes) through the dispatcher loop to process. If INJavaScript is true, the dispatcher loop should attempt to find the end of the script instead of initially looking for a next tag. When parsing HTML, the Filter loop (described below) may iterate before the end of the current HTML tag has been found. Therefore, both the INJavaScript and KillNextIMG Boolean parameters serve as housekeeping flags facilitating this process.

After declaring local variables (lines 4–28), the method allocates memory at line 31 for storing an imgURL_struct. This data structure serves to characterize a URL. In an exemplary embodiment, the data structure may be created as follows.

```
typedef struct {
    char protocol[15];
    char server[SERVER_STRUCT_SIZE];
    int port;
    char URI[URI_STRUCT_SIZE];
} URL, *pURL;
```

As shown, the structure stores four data members. The first data member, protocol, is a character string (array) storing a particular protocol; it is not used within the Filter method. The second data member, server, stores a text string identifying the server (i.e., Web server). The third data member, port, stores a port number (i.e., IP port address). The fourth data member, URI, stores a character string indicating the actual URL address. If the URL data structure cannot be allocated (tested at line 32), the method displays an error message (lines 34–36). In a similar manner, the method allocates a URL structure for storing the base URL. This information is helpful in the event that relative URL addressing is employed. Again, if the allocation fails, the method displays an error message.

Beginning at line 53, the method begins processing for JavaScript. Specifically, the method first tests whether the JavaScript Boolean flag is set to "true." This flag will be set, for instance, when executing a lengthy JavaScript. Recall that the network delivers a sequence of blocks. As a result, a lengthy JavaScript may span multiple blocks or packets. Therefore, the flag tested at line 53 determines whether the dispatcher loop is still examining a JavaScript (as a result of having begun inspecting the current JavaScript segment in a prior buffer block.)

Specific processing in the event that the method is still executing in JavaScript is as follows. At line 56, the method searches for the string "/script" in the buffer. If this is not found (the "if" statement at line 57 evaluates to "false"), the method calculates a decrement value at line 62; this value is the difference between the current pointer position in the buffer (cursor) and the end of the buffer. At line 63, the method resets the INJavaScript Boolean to "false." At lines 64–67, the method frees the two previously-allocated URL structures. Then, at line 68, the method returns the decrement value. By returning a "decrement," the method is indicating that it desires to keep the data around (so that it can complete processing once all relevant JavaScript blocks have been received). If, on the other hand, the end of the script is found (true at line 72), the method proceeds to execute the "else" statement at lines 76–-83. At this point, the method sets the INJavaScript Boolean to "false," at line 81. Then, at line 82, the method adjusts the current buffer position (cursor) to move past the JavaScript (i.e., past where the "/script" tag is found).

In the event that the "/script" tag is not found, the method searches for the next tag, by searching for a ">" symbol; this is performed at line 102. If the next tag cannot be found (the result is tested at line 103), the method returns, at line 111. If a next tag is found, however, the system will continue parsing from that point. Specifically, the method changes its position in the buffer and returns a decrement value accordingly. Another possibility, however, is that no end tag is found. In such a case, the system requires more information. In the event that the "/script" tag is found, the system can move past the JavaScript and continue parsing.

Having dealt with JavaScript issues, the Filter method can now proceed to parse HTML. This is done by entering the "while" loop, at line 88. The method proceeds as follows. At line 102, the method searches for a"<" symbol, for locating the beginning of an HTML tag. If it cannot find a tag at all, the method has processed the buffer and may return (line 111).

At this point, the method must also handle any comments which might be encountered within the HTML. If a comment is found, the method then proceeds to find the end of the comment. If the end is not found, the method is again faced with a decrement scenario (which can be processed in a manner similar to that described above). Otherwise, the method proceeds to the end of the comment and continues parsing from that point onward. In the event that this is not a comment, the method continues execution at the "else" statement starting at line 154.

The method at this point now begins looking for the right side of the tag (i.e., ">" symbol), having found a valid left side. If the right side is not found (i.e., a hanging tag scenario), the method proceeds in a manner similar to that described above for obtaining more data. If a full tag has been found, however, the method allocates memory for the tag's data, including the tag delimiters.

Now the method has a fully qualified tag and is ready to apply filtering methodology in accordance with the present invention. At this point, the method searches through the full tag, first trying to locate any embedded image tags. This is done by searching for the substring "IMG" using a case insensitive substring match. If an image tag is not found (false at line 198), the method at this point tests whether the tag is one of the following types: blink, applet, script, href, and frameset. Respective Boolean flags are set for each one encountered; these flags are employed later in the method.

Now, the method will undertake specific processing for individual tags. For instance, the blink tag is processed at lines 219–228. If a blink tag has been found and the user has configured the Filter to turn off blinking text, the method will at this point kill the blink tag. Thus at this point, the system has already begun tag fixup based on user configuration of the Filter.

Actual handling of a Java tag begins after line 229. The data structure javabinloc stores information indicating the location for the Java binary. At this point, the method looks for the end of the Java applet, by searching for the string "applet" at line 237. The method includes at this point error handling steps in the event that the end of the applet cannot be found. Ordinarily, however, the end is found and the method may proceed to kill the Java applet. This is done by passing the Java binary to a specialized handler, Killjava, at line 286. The subroutine call returns "true" if the Java applet is one to kill. The lookup can be performed, for instance, by comparing the applet name (text string) against a database of Java applets to kill. In the event that the applet is one to kill ("true" at line 286), the method overwrites the corresponding memory location of the applet with white space (e.g., space character), at line 293. For user interface purposes, the method increments a counter ("number of ads killed"), at line 295, which is available for user feedback of filtering activity.

Processing of JavaScript begins at line 307. At the outset, the method verifies that it is in fact dealing with JavaScript at this point. This can be accomplished, for instance, by testing that the first six characters following the script tag are not alphabetic, as shown at line 311. Additionally, at line 314, the method finds the end of the script, by locating the "/script" tag. If the end of the script is not found, tested at line 316, the method asks for more data, by returning a decrement value (in a manner similar to that previously described). Note also at this point that the INJavaScript Boolean is set to "true," at line 322. Eventually (if no error occurs), the end of the script will be found. In such a case, the method executes the steps beginning at line 357, for moving past the script (i.e., moving beyond the ">" symbol) and continuing filter processing from that point on.

Processing for hypertext reference or href tags begins at line 363. An href tag defines a hypertext link or "hyperlink" to another object. For instance, the tag:

<A HREF="http://adsl.zdnet.com/adverts/SampleAd.html"></A> defines a link to a document, SampleAd.html. At line 365, the method confirms that an href tag has been found (by examining the previously-set Boolean) and confirms that the tag is fully qualified.

An href or hypertext reference tag is often associated with an image. Therefore, the method must process the href tag to kill any image tags contained within it. By examining the href itself, the system can often discern whether images contained within it are ads. Specifically, the system can discern a hypertext jump destination which is invoked from a particular image. If the destination is an ad site (e.g., such as the adsl destination shown above), the system can block the image(s) associated with the href tag for the hypertext reference to that site. The actual subroutine call to lookup the image as one referencing an ad site occurs at line 370. In the event that the image is identified as an ad, the method sets the KillNextIMG flag to "true" at line 377 and increments the "number (of ads) killed" counter at line 380. Since the kill next image flag has been set, the next iteration through the loop will kill any image which it follows within this href tag.

At line 399, the method filters any spawning activity—that is, when a URL site "spawns" a new browser window. Since this action may have undesirable user interface consequences, the user can turn spawning off. In such a case, the Filter method kills spawning when found, as shown at lines 401–414.

Beginning at line 429, the method begins processing of an image tag. If the "kill next image" flag has been set to "true" (such as described above), the method proceeds to perform setup for killing the image, at lines 432–437. Before actually killing an image, however, the method verifies that the image tag does in fact have an image. This is shown at line 438, where the method searches for the image source (src). If an actual image is not located within the image tag, then the tag is a "bad tag" and, thus, requires error handling. Normally, however, an image tag will not be bad (tested at line 489) and the method can proceed to kill the image.

To kill or filter the image, the method allocates a memory buffer at line 458, for storing an image URL data structure. At line 475, the full tag is copied into the image URL structure. Then, at line 477, the method parses the image URL, and then parses the base URL at line 478. This setup allows the system to establish a network connection with the site, if needed. At lines 483–484, the method creates a fully qualified image URL (structure), converting from relative addressing if needed. How the image is to be killed is determined at line 491, by referencing a per session cache storing results on how to process images. If the image is on the user's personal kill list (tested at line 492), the method proceeds to kill the image. The specific call for killing the image occurs at line 501.

If the Filter is configured to kill ads or kill images larger than a preselected image size (tested at line 506), the method proceeds as follows. The method establishes a network connection. At this point, the server is queried for determining the image size. If the image size exceeds a maximum image size desired by the user, the image will be killed.

For ads, if the browser is at a site which requires further inspection, the method undertakes a CRC check of the image. Specifically at this point, the system connects to the Web site, grabs the image file from the site, and then proceeds to perform a CRC calculation (line 584) on the image. The calculated CRC value is then compared against a list of image signatures or IDs. In other words at this point, the method creates a dummy signature for the image, for identifying the images contents. If the computed ID is determined to represent a "bad" image—that is, an unwanted image which is targeted for filtering (e.g., ad image)—the method proceeds to kill the image at lines 620–631. Additionally, the image is killed at lines 611–617 in the event that it exceeds a maximum image size. If, on the other hand, the signature value for the image does not indicate a "bad" image and the image does not exceed a maximum size, the image is passed through without filtering.

After processing the image tag (with or without filtering of the image), the method may loop on the next tag. Note, however, that if a corrupt or "bad" tag had been encountered during the loop (i.e., the Bad_Tag flag is set to "true"), the method sets the current buffer position beyond the bad tag before looping, as shown at line 660–663. At this point, the method will loop for another iteration of the "while" loop for further processing of tags.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A system for dynamically processing browser-generated requests for content using a modular filter, comprising:
   a browser executing on a client generating a request specifying content for retrieval from a server, the content request comprising at least one tag indicating a particular type of content request;
   a modular filter interfaced to the browser trapping the content request prior to the content request being issued to the server;
   a dispatch loop executing within the modular filter switched on the type of the at least one tag;
   an image tag handler associated with each particular type of tag, the dispatch loop dispatching the content request to the image tag handler associated with the particular type of tag for each at least one tag;
   the associated image tag handler processing information within the content request; and
   a communications layer driver interfaced with the modular filter and functionally interposed between the browser and, a communications channel linking the client with the server.

2. A system according to claim 1, each such image tag handler further comprising:
   a process performing a selected one of modifying the content request, deleting the content request, synthesizing a new request for content, and passing the content request through to the server.

3. A system according to claim 1, wherein the communications layer driver implements a communications layer in compliance with the Transmission Control Protocol/Internet Protocol (TCP/IP).

4. A system according to claim 1, further comprising:
   an administration module interfaced with the modular filter and providing a user interface with which to configure the modular filter.

5. A system according to claim 1, wherein the content request is written in tag-delimited scripting language selected from the group comprising the Hypertext Markup Language (HTML) and the Extensible Markup Language (XML).

6. A method for dynamically processing browser-generated requests for content using a modular filter, comprising:
   generating a request on a browser executing on a client and specifying content for retrieval from a server, the content request comprising at least one tag indicating a particular type of content request;
   trapping the content request with a modular filter interfaced to the browser prior to the content request being issued to the server;
   executing a dispatch loop within the modular filter switched on the type of the at least one tag;
   for each at least one tag, dispatching the content request to an image tag handler associated with the particular type of the at least one tag;
   processing information within the content request with the associated image tag handler; and
   interfacing the modular filter with a communications layer driver functionally interposed between the browser and a communications channel linking the client with the server.

7. A method according to claim 6, the operation of processing information further comprising:
   performing a selected one of modifying the content request, deleting the content request, synthesizing a new request for content, and passing the content request through to the server.

8. A method according to claim 6, wherein the communications layer driver implements a communications layer in compliance with the Transmission Control Protocol/Internet Protocol (TCP/IP).

9. A method according to claim 6, further comprising:
   interfacing the modular filter with an administration module providing a user interface with which to configure the modular filter.

10. A method according to claim 6, wherein the content request is written in tag-delimited scripting language selected from the group comprising the Hypertext Markup Language (HTML) and the Extensible Markup Language (XML).

11. A computer-readable storage medium holding code for dynamically processing browser-generated requests for content using a modular filter, comprising:
    generating a request on a browser executing on a client and specifying content for retrieval from a server, the content request comprising at least one tag indicating a particular type of content request;
    trapping the content request with a modular filter interfaced to the browser prior to the content request being issued to the server;
    executing a dispatch loop within the modular filter switched on the type of the at least one tag;
    for each at least one tag, dispatching the content request to an image tag handler associated with the particular type of the at least one tag; and
    processing information within the content request with the associated image tag handler; and
    interfacing the modular filter with a communications layer driver functionally interposed between the browser and a communications channel linking the client with the server.

12. A storage medium according to claim 11, the operation of processing information further comprising:
    performing a selected one of modifying the content request, deleting the content request, synthesizing a new request for content, and passing the content request through to the server.

13. A storage medium according to claim 11, further comprising:
    interfacing the modular filter with an administration module providing a user interface with which to configure the modular filter.

14. A system for actively filtering tag-delimited content request commands generated by a browser executing on a client, comprising:
    an output stream comprising one or more content request commands which each comprise one or more tags delimiting the content to be retrieved from a server;
    filtering core logic intercepting the output stream prior to sending the content request commands to the server; and
    one or more tag handlers processing the intercepted output stream, comprising:
      an individual tag handler associated with each such tag in the content request commands;
      a dispatching loop dispatching the content request command to the associated tag handler for each such tag; and the associated tag handler processing the content request command; and a communications layer driver interfaced with the filtering core logic and functionally interposed between the browser and a corumunications channel linking the client with the server.

15. A system according to claim 14, further comprising:

an input stream comprising content received from the server responsive to the content request commands.

16. A system according to claim 14, further comprising: a user interface administering the filtering core logic.

17. A system according to claim 14, further comprising:

each individual tag handler performing at least one of modifying the request command, deleting the request command, synthesizing a new request command, and passing the request command through to the server.

18. A method for actively filtering tag-delimited content request commands generated by a browser executing on a client, comprising:

generating an output stream comprising one or more content request commands which each comprise one or more tags delimiting the content to be retrieved from a server;

prior to sending the content request commands to the server, intercepting the output stream with filtering core logic; and processing the intercepted output stream, comprising:

determining a tag handler associated with each such tag in the content request commands;

for each such tag, dispatching the content request command to the associated tag handler; and processing the content request command with the associated tag handler; and interfacing the filtering core logic with a communications layer driver functionally interposed between the browser and a communications channel linking the client with the server.

19. A method according to claim 18, further comprising:

receiving an input stream comprising content received from the server responsive to the content request commands.

20. A method according to claim 18, further comprising:

administering the filtering core logic.

21. A method according to claim 18, further comprising:

performing at least one of modifying the request command, deleting the request command, synthesizing a new request command, and passing the request command through to the server.

* * * * *